Dec. 9, 1958 — L. R. SHINER — 2,863,487
SPECTACLE CASE
Filed May 24, 1956

Lawrence R. Shiner
INVENTOR.

BY Eugene E. Stevens
Eugene E. Stevens III
ATTORNEYS

United States Patent Office 2,863,487
Patented Dec. 9, 1958

2,863,487

SPECTACLE CASE

Lawrence R. Shiner, Allentown, Pa.

Application May 24, 1956, Serial No. 587,073

1 Claim. (Cl. 150—52)

My invention relates to improvements in spectacle cases and the like.

It is an object of my invention to provide a spectacle case which will protect the spectacles and still be of a size that is convenient to carry in a man's pocket or in a women's purse.

Another object of my invention is to provide a spectacle case which will conform substantially to the shape of the spectacles.

A further object is to provide a spectacle case that will correctly position the spectacles therein and that will tightly retain the spectacles.

Still a further object is to make a case which uses a minimum of parts and is simple and inexpensive to manufacture.

Other objects and advantages of the invention will be apparent during the course of the following description.

In the accompanying drawing, forming a part of this application and in which like numerals are employed to designate like parts throughout the same—

Figure 1:
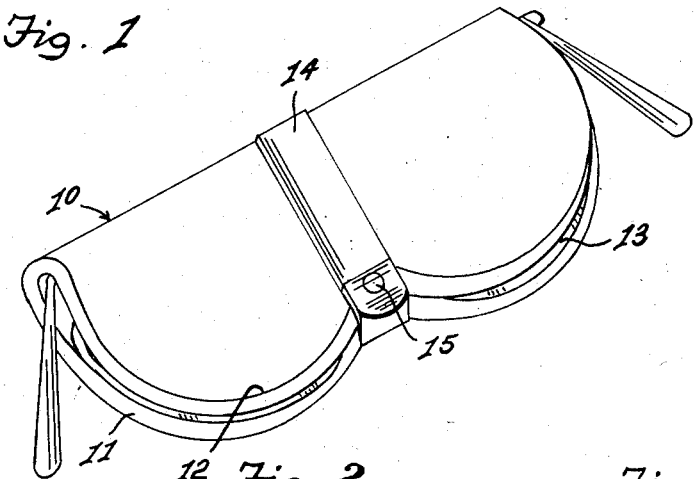
Figure 1 is a perspective view of my invention showing the spectacles within the case.

In the drawing, wherein for the purpose of illustration is shown a preferred embodiment of my invention, the numeral 10 indicates the case body in general which is composed of a relatively thick inner layer 11 of absorbent material such as foam rubber, plastic foam, sponge or the like, and a relatively thin outer layer 12 which is preferably of a durable yet flexible material such as leather, leatherette, or the like.

The case body 10 is folded over as shown in Figure 1 to provide the spectacle case, and when the body 10 is so folded the lower portion is shaped to conform to the configuration of the spectacles 13.

A strap 14 is attached to the mid portion of the upper part of the body 10 and tightly encircles the case body 10 and is fastened by any conventional fastener such as the snap 15.

In order to make the case more compact and to properly align the spectacles within the case, I provide a cut-out or recess nose receiving portion 16 which has side walls 17 cut at an angle to accommodate the angle of the nose piece 13a of the spectacles 13. I also provide an elongated recess or cutout portion 18 adjacent the nose receiving recess 16 which receives the upper portion of the spectacle rim 13b and a portion of the ear pieces 13c. The cutout portion 18 also serves to facilitate the folding of the body 10. The cutout portions 16 and 18 extend through the inner layer 11.

Figure 2:
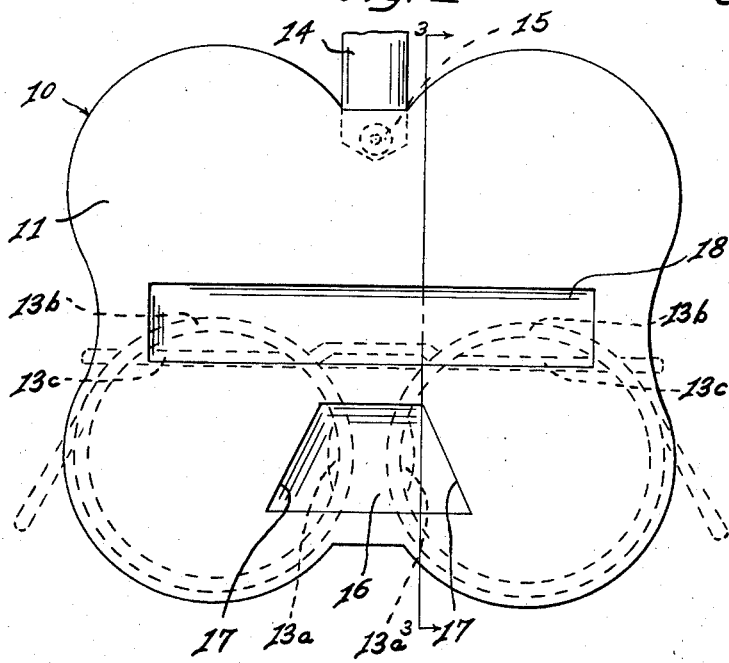
Figure 2 is a plan view of my invention in the open position showing the spectacles positioned therein prior to closing the case.
Figure 3:
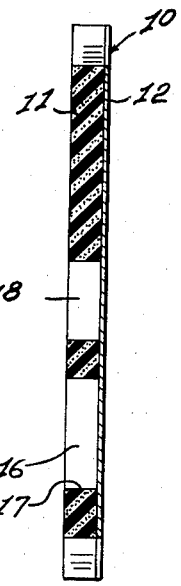
Figure 3 is a sectional view taken on line 3—3 of Figure 2.

It is particularly to be noted from Fig. 2 that when the top flap is folded down over the spectacles on the base flap, as in Fig. 2, the yielding ends of the fold-defining cutout 18 will yieldingly engage the lens portions outwardly of the upper recess-seated portions thereof. Thus cutout 18 will prevent outward shifting of the spectacles. In this respect it cooperates with the base flap recess 16 and relieves the seated nose piece 13a of the spectacles of undue strain.

As will appear from the foregoing, it is a simple matter to open the snap 15 thereby loosening the strap 14 and gain access to the interior of the case. The spectacles rest firmly and safely within the case and are maintained in the proper position by the cutout portions 16 and 18.

It is understood that the form of my invention, herewith shown and described, is to be taken as a preferred example of the same, and that various changes in the shape and size may be resorted to without departing from the spirit or scope of my invention, as hereinafter claimed.

Having thus described my invention, I claim:

As a new article of manufacture, a spectacle case comprising a flexible two ply sheet form body, the outer ply being of thin wear resisting flexible material, the inner ply being of a thickness at least approximately that of folded spectacles at the site of the nose-seat thereof and being of springy foam rubber-like cushioning material, the width of said body somewhat exceeding spectacles length at the site of the lenses thereof and its depth being more than twice spectacle depth from lens top to lens bottom, said inner ply having a rectangular fold area-defining cutout located midway between the upper and lower edges of the body and terminating short of each side of the latter, said cutout providing yielding end walls and being of a length less than spectacle length at the site of the lenses thereof, said body transversely foldable at the fold area to define a base flap and a cover flap, the inner ply of said base flap having a spectacle nose-seat receiving cutout, the cover flap foldable to overlie the spectacles on said base flap and to effect seating of the intermediate upper spectacle lens portions in the fold area-defining cutout whereby the yielding end walls of the latter cutout engage outer upper lens portions to cooperate with the nose seat-receiving cutout to retain the spectacles in the case, and fastening means securing the flaps in overlying case-defining relationship.

References Cited in the file of this patent

UNITED STATES PATENTS

| | | |
|---|---|---|
| 2,228,493 | Will | Jan. 14, 1941 |
| 2,650,700 | Wolf | Sept. 1, 1953 |
| 2,657,791 | Grosvenor | Nov. 3, 1953 |
| 2,706,036 | Neal | Apr. 12, 1955 |
| 2,720,305 | Foster | Oct. 11, 1955 |
| 2,738,054 | Baratelli | Mar. 13, 1956 |
| 2,739,698 | Baratelli | Mar. 27, 1956 |